Nov. 10, 1953  S. KAPLAN ET AL  2,658,275
CHEESE CUTTER
Filed Sept. 11, 1951  2 Sheets-Sheet 1
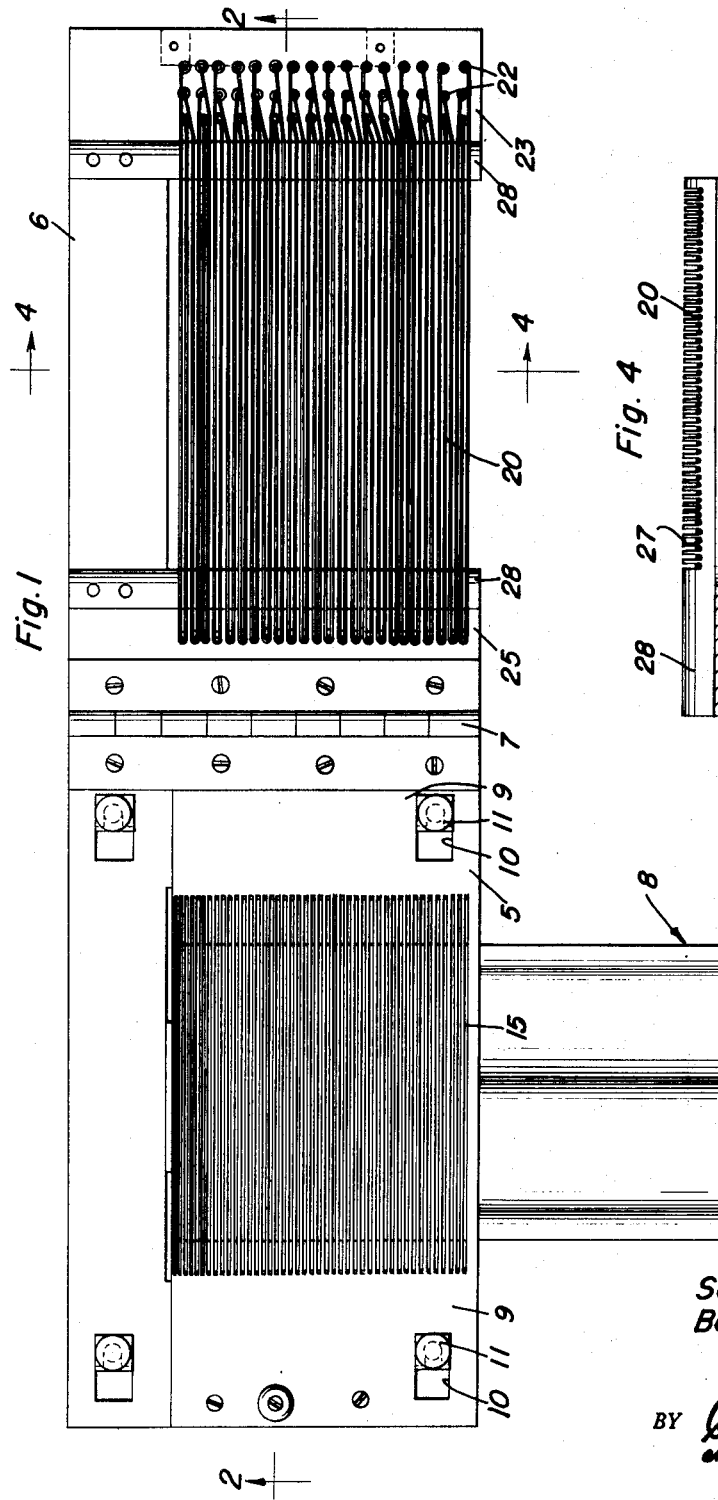
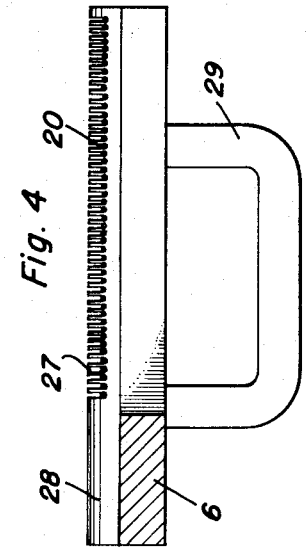
Sol Kaplan
Benjamin Platts
INVENTORS.
BY
Attorneys

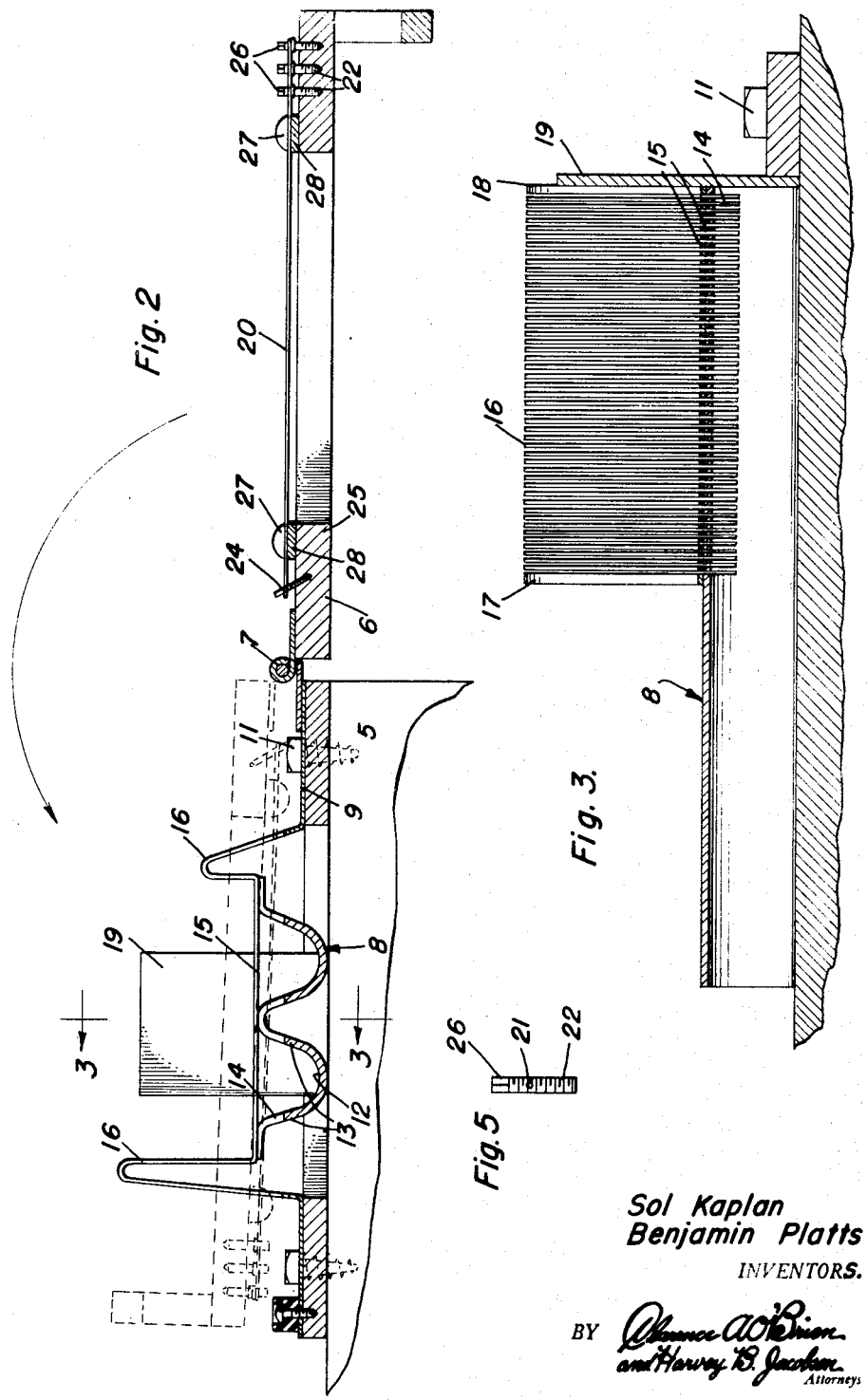

Patented Nov. 10, 1953

2,658,275

UNITED STATES PATENT OFFICE 2,658,275

CHEESE CUTTER

Sol Kaplan, University City, and Benjamin Platts, St. Louis, Mo.

Application September 11, 1951, Serial No. 246,012

2 Claims. (Cl. 31—25)

The present invention relates to new and useful improvements in cheese cutters and more particularly to a hand operated cutter including a vertically swingable frame having a plurality of spaced parallel cutting wires whereby multiple slices may be simultaneously cut from a block of cheese.

An important object of the invention is to provide a platform or base of novel construction on which the cheese is held and having upstanding guide rods at each side of the cheese and between which the cutting wires pass to maintain the wires in parallelism when passing through the cheese.

Another object is to provide a unitary platform and guide rods with means for easily and quickly attaching the same on a base frame for convenient removal for cleaning.

A further object is to provide adjustable screws for the cutting wires to tighten the cutters.

A still further object is to provide a device of this character of simple and practical construction, which is efficient and reliable in operation, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 2 is a longitudinal sectional view taken on a line 2—2 of Figure 1;

Figure 3 is an enlarged transverse sectional view taken on a line 3—3 of Figure 2;

Figure 4 is an enlarged transverse sectional view taken on a line 4—4 of Figure 1; and, Figure 5 is a perspective view of one of the tightening screws for the cutting wires.

Referring now to the drawings in detail, wherein for the purpose of illustration we have disclosed a preferred embodiment of our invention, the numeral 5 designates a base frame of U-shape and 6 is a cutting frame also of U-shape and hinged at one side edge to the base frame by a conventional type of hinge structure 7 for swinging cutting frame 6 vertically on top of base frame 5.

A platform is designated generally at 8 and is of sheet metal construction to provide attaching flanges 9 at its side edges and formed with key hole openings 10 for attaching to the parallel sides of the base frame by screws 11 to facilitate quick removal of the platform by loosening the screws.

The central portion of the platform is corrugated to form a pair of spaced valleys or parallel channels 12 positioned parallel to the sides of the base frame and extending outwardly at the open edge of the frame. The undulations of platform 8 forms parallel hills or ridges 13 formed with transverse guide slots 14 and the upper edges of the hills or ridges are welded to the underside of spaced parallel guide bars 15 formed at their end portions with a row of inverted substantially U-shape upstanding guides 16 which are integrally formed or otherwise united with the flanges 9 to thus provide a row of upstanding guides at each side of platform 8. The end upstanding guides of each row are of substantially increased width, as shown at 17 and 18, to add strength at the ends of the row of guides, and an upstanding stop plate 19 is welded to the inner end of the channel portion 12 of platform 8.

A plurality of cutting wires 20 are secured in spaced parallel relation to each other by attaching the ends of the wires in openings 21 in screws 22 threaded in the outer side or leg portion 23 of cutting frame 6 and extending the central portion of the wires around a pin or peg 24 preferably threaded in the inner side or leg portion 25 of the cutting frame. Screws 22 are formed with square or other gripping heads 26 to tighten the wires.

The cutting wires pass through slots 27 in the upper edge of guide strips 28 secured to the side or leg portions 23 and 25 of cutting frame 6 to hold the wires alined with the slots formed by the guides 16 carried by base frame 5.

A handle 29 is carried at the outer edge of cutting frame 6 and in the operation of the device a block of cheese (not shown) is placed on platform 8 against stop plate 19 and between the row of upstanding guides 16 and cutting frame 6 is swung upwardly by handle 29 over base frame 5 and the wires 20 forced downwardly to cut the cheese into slices.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A cheese cutter comprising a base frame, a cutter frame hingedly connected to the base frame for swinging on top of the former, a plurality of cutting wires carried by the cutter frame, a work support including a plurality of spaced parallel bars, upstanding parallel rows of guides united with the bars at the ends of the latter to receive the cutting wires therebetween, means attaching the guides to the base frame, and a corrugated bracing member under the bars and supporting the bars at longitudinally spaced apart intervals, said bracing member also having slots alined with the guides to receive the cutting wires.

2. A cheese cutter comprising a base frame of U-shaped construction, a plurality of spaced parallel guide bars positioned transversely between the sides of the base frame, upstanding rows of guides united to the guide bars at the ends of the latter, attaching flanges united with the upstanding guides and secured on top of the base frame, an undulated rigid work supporting platform having parallel ridges and valleys positioned transversely under the bars and with the ridges supporting the bars at longitudinally spaced apart intervals of the latter, said platform extending outwardly at the open end of the base frame, a cutter frame pivoted to the base frame for swinging vertically into and out of position on top of the base frame, and a plurality of spaced parallel cutter wires carried by the cutter frame adapted to pass between the guides and guide bars to cut work resting on the latter into slices.

SOL KAPLAN.
BENJAMIN PLATTS.

References Cited in the file of this patent

UNITED STATES PATENTS

| Number | Name | Date |
|---|---|---|
| 553,434 | Sigmund | Jan. 21, 1896 |
| 717,223 | Leachman | Dec. 30, 1902 |
| 1,531,314 | Simberg et al. | Mar. 31, 1925 |
| 1,658,675 | Frank | Feb. 7, 1928 |
| 1,685,245 | Russo | Sept. 25, 1928 |
| 1,753,371 | Georgopoulos | Apr. 8, 1930 |
| 1,796,212 | Nadeo | Mar. 10, 1931 |
| 2,158,667 | Rieck et al. | May 16, 1939 |
| 2,592,657 | Cierley | Apr. 15, 1952 |

FOREIGN PATENTS

| Number | Country | Date |
|---|---|---|
| 387,310 | Germany | Dec. 28, 1923 |
| 603,764 | Germany | Oct. 8, 1934 |